Sept. 23, 1952     R. SPURR     2,611,525
MECHANISM FOR CHARGING CONTAINERS
Filed July 8, 1946     8 Sheets-Sheet 8
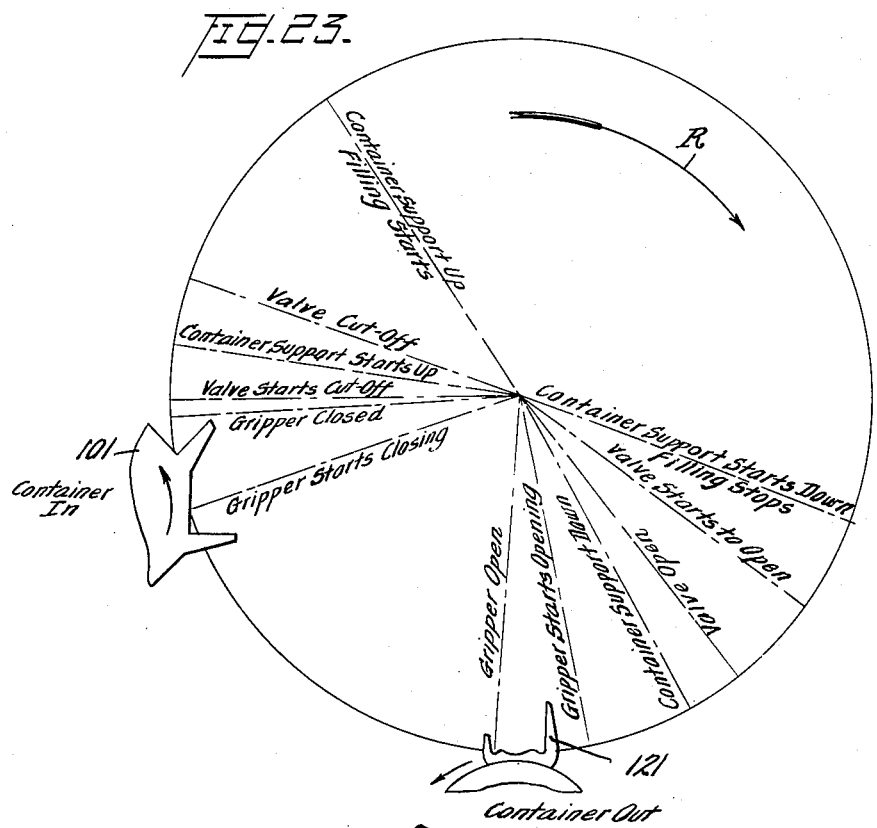
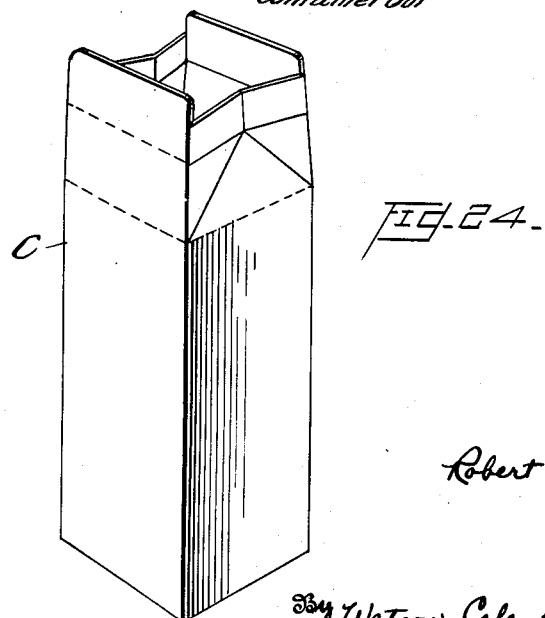

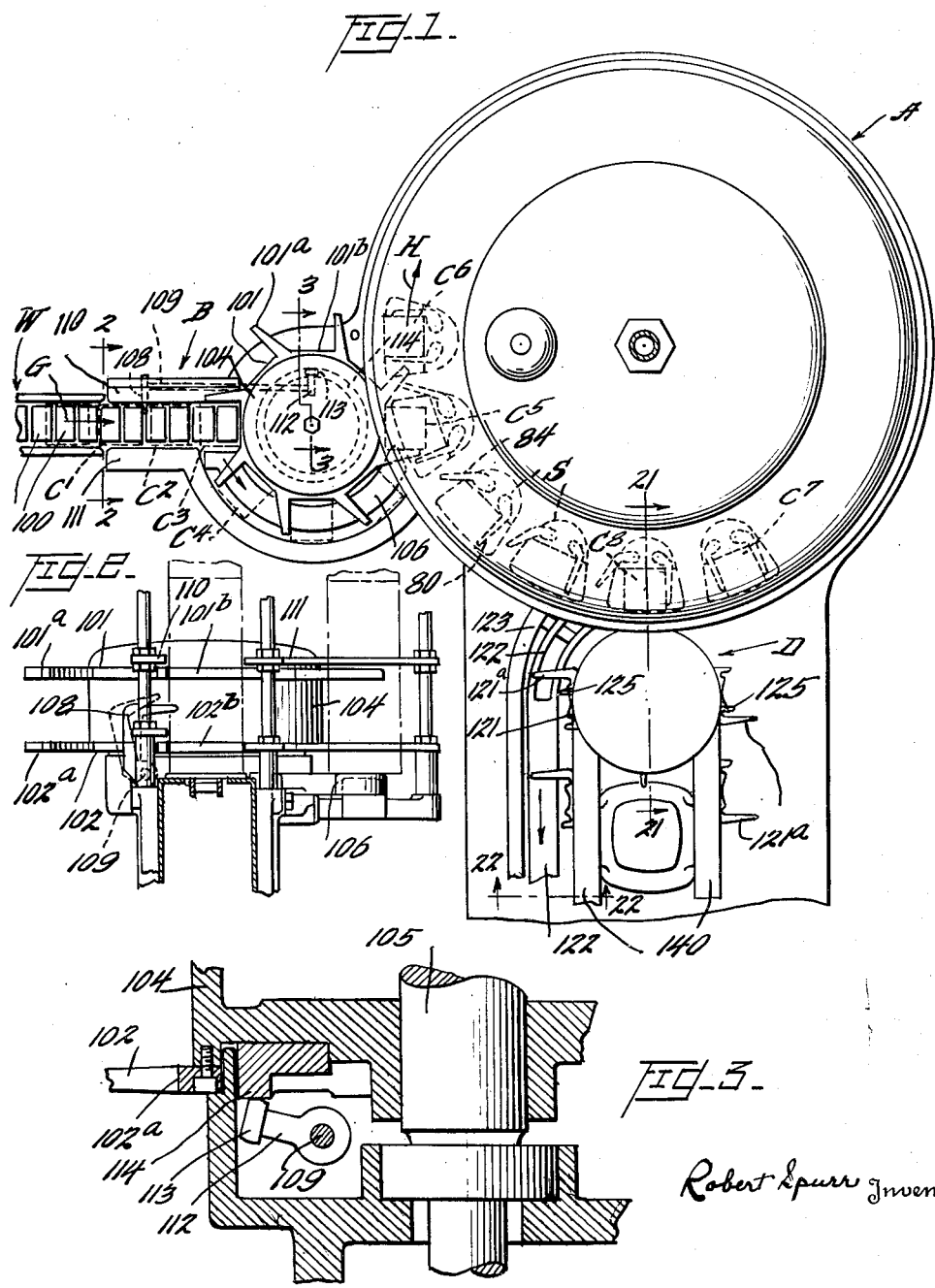

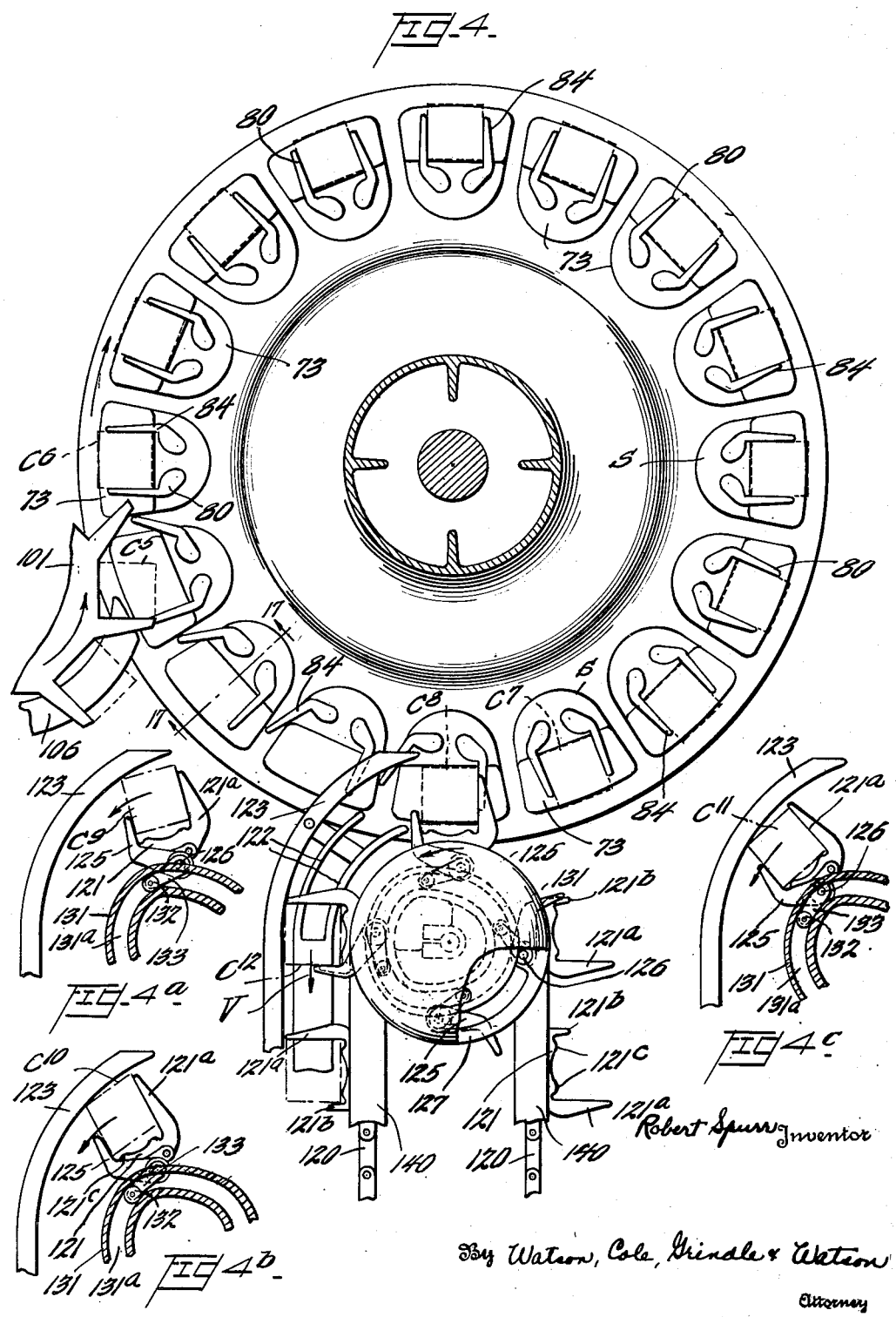

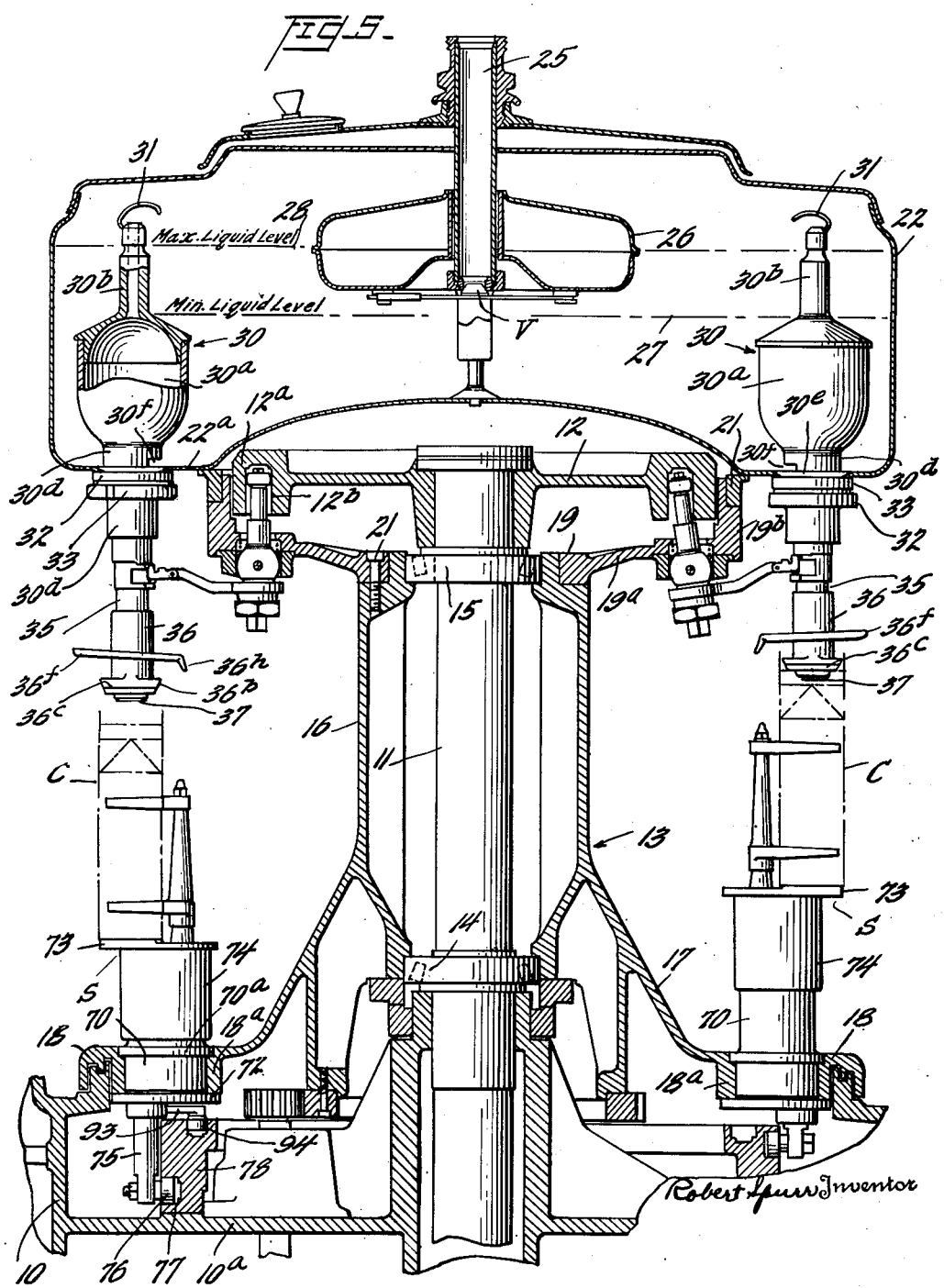

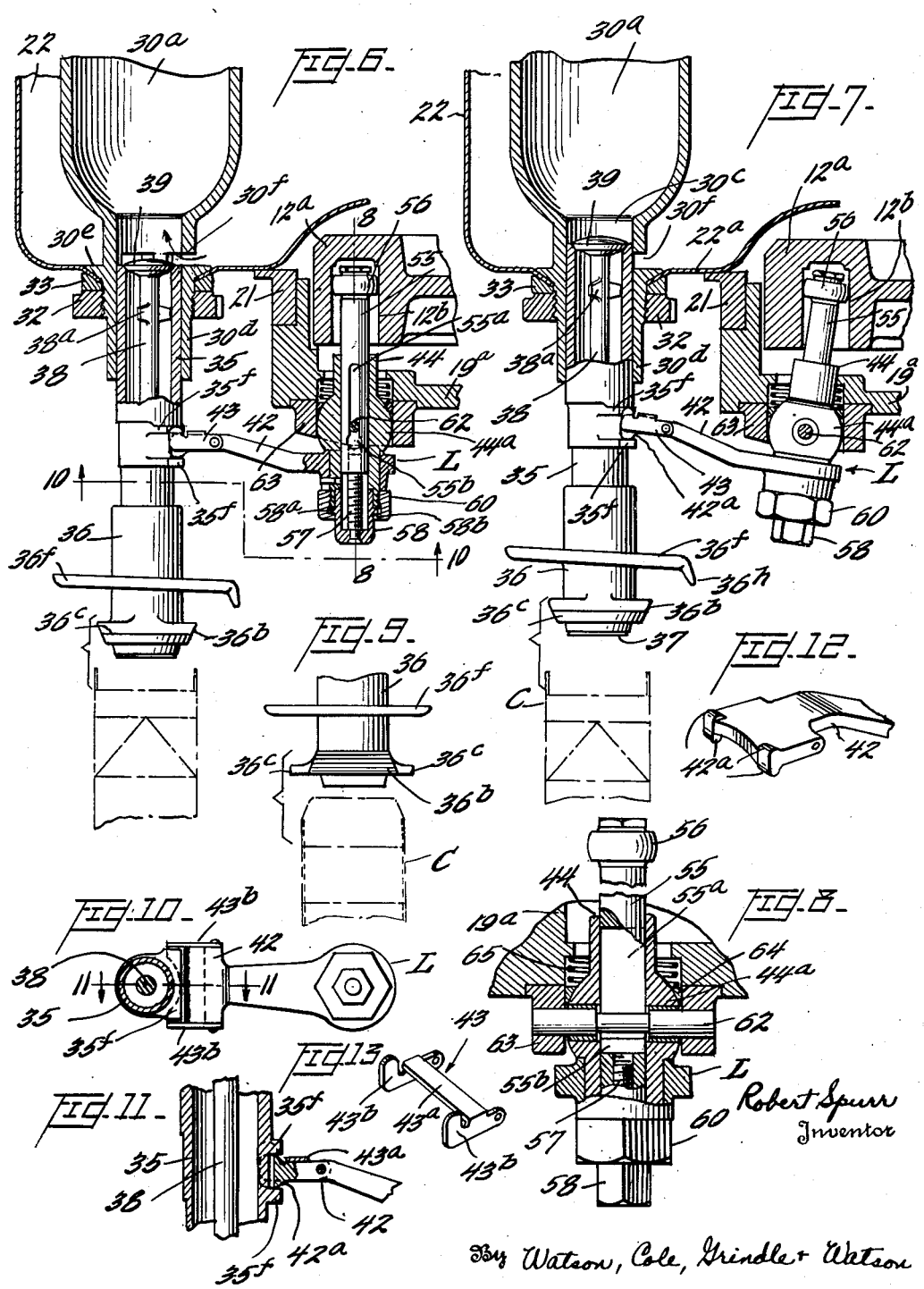

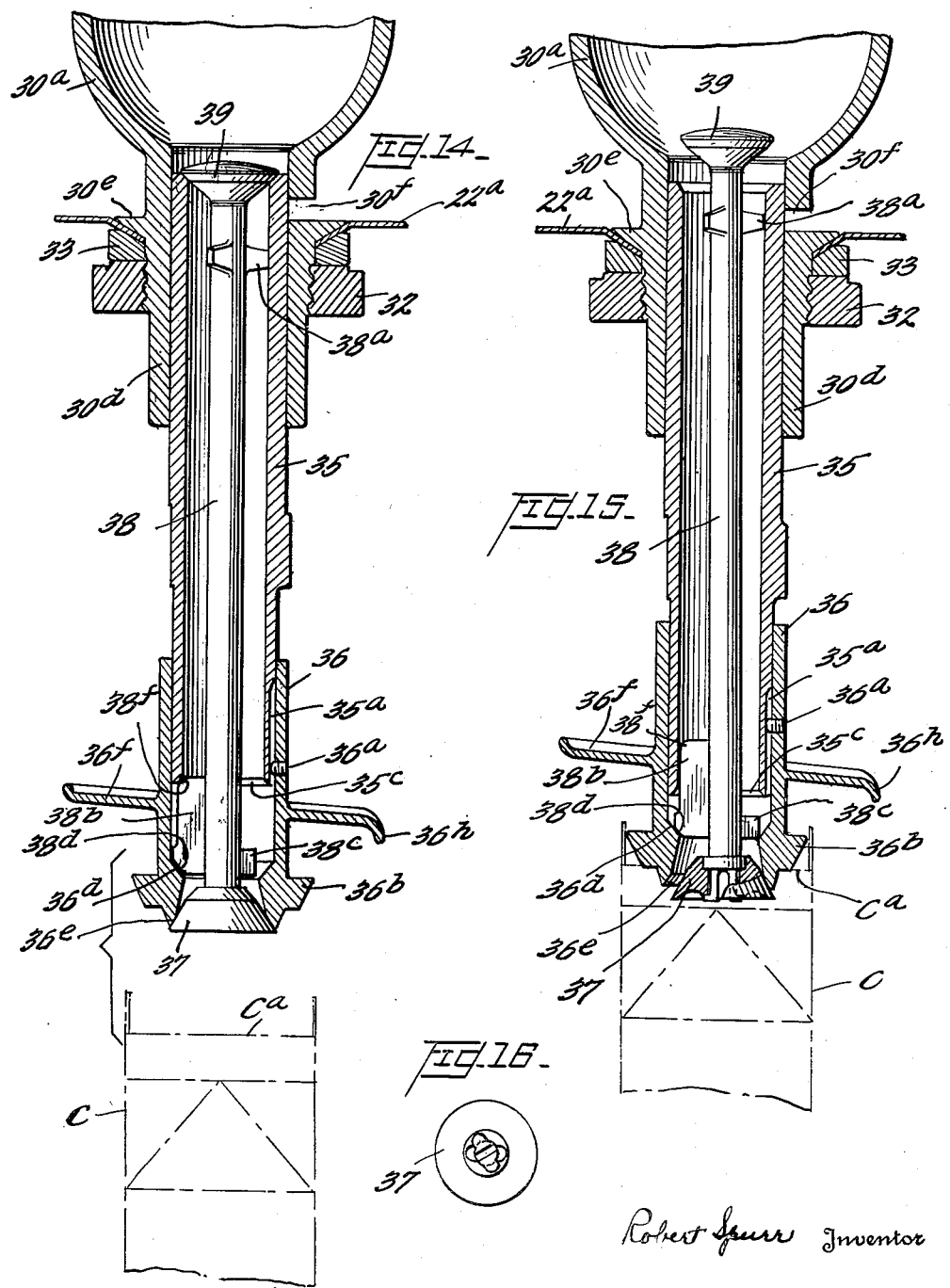

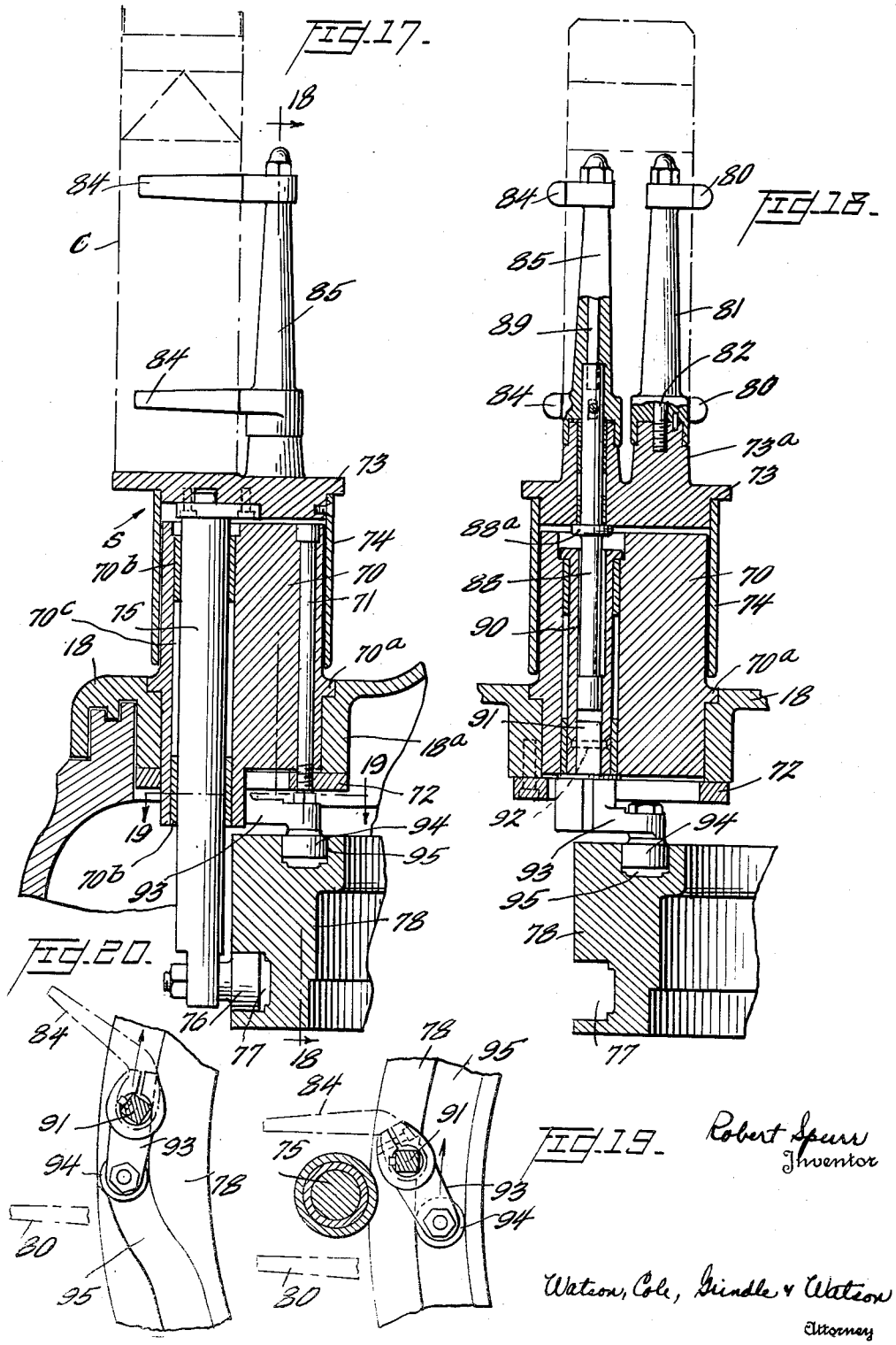

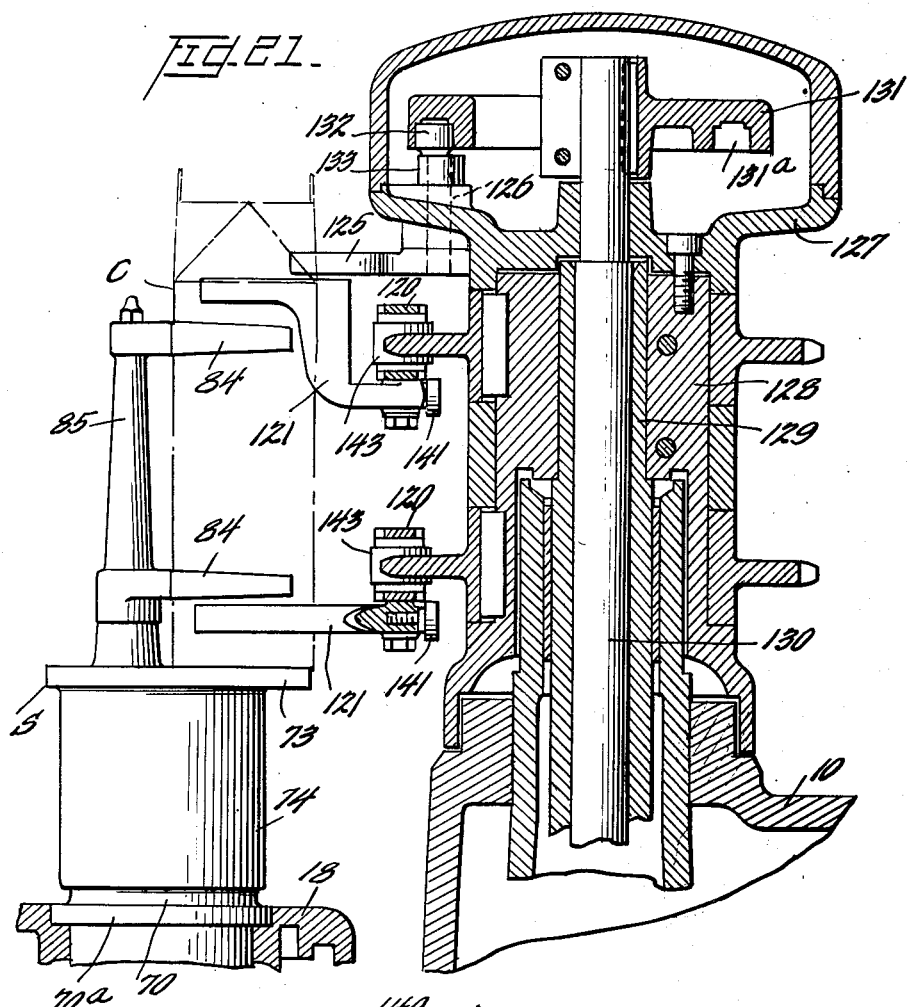
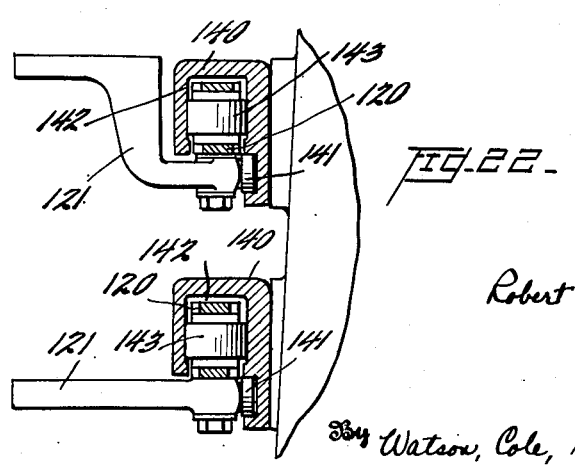

Patented Sept. 23, 1952

2,611,525

UNITED STATES PATENT OFFICE 2,611,525

MECHANISM FOR CHARGING CONTAINERS

Robert Spurr, Syracuse, N. Y., assignor to Ex-Cell-O Corporation, Detroit, Mich., a corporation of Michigan Application July 8, 1946, Serial No. 682,013

15 Claims. (Cl. 226—97)

In Patent No. 2,353,519, granted July 11, 1944, there is disclosed and claimed a mechanism for charging containers, such mechanism being of the fully automatic type and so designed and constructed as to be capable of charging a precisely measured volume of liquid into each container of a series of empty containers successively presented to it by conveying mechanism.

The charging mechanism of the patented machine includes a liquid storage tank mounted upon a rotatable turret and a number of liquid measuring and dispensing devices adapted to function while the turret rotates in a continuous manner, associated means successively placing empty containers on the turret at one point and a second means removing filled or charged containers from the turret at a second or discharge station, the mechanism as a whole, including both the rotary turret and tank and the container loading and unloading mechanism, being particularly well suited for use in association with other essential mechanisms of a completely automatic machine for the fabrication, coating, charging, closing and sealing of paper containers. Such machines have been designed particularly for use in dairies and are now widely used for the automatic packaging of milk for distribution to consumers. Without material modification, however, other liquids may be packaged by means of the improved charging mechanism.

The present invention is intended to accomplish the major functions of the charging mechanism previously patented but embodies a number of features of improvement which render it more satisfactory to the user in certain respects, the mechanism as an entirety having been simplified to a substantial extent by a reduction in the number of moving parts and various elements of the mechanism having been so designed and arranged with respect to other mechanisms of the apparatus as a whole as to be more readily reached for the purpose of sterilization, adjustment or disassembly. The mechanism which effects the accurate measuring of the liquid to be charged has been redesigned, simplified and improved. Other features of novelty, together with those mentioned, render the machine less likely to need repairs or adjustments, even after long periods of use.

In the accompanying drawings a preferred embodiment of the mechanism is illustrated and will hereafter be described in detail. It will be appreciated that the embodiment of the invention thus illustrated is susceptible of modification to suit varying conditions, as when liquids other than milk are to be accurately measured and discharged into containers, and when containers having sizes and shapes different from that illustrated are to be charged. The invention is thus not limited to the specific machine illustrated by way of example.

In the drawings:

Figure 1 is a top plan view of the mechanism;

Figure 2 is a section on line 2—2 of Figure 1;

Figure 3 is a section on line 3—3 of Figure 1;

Figure 4 is a horizontal section through the machine, disclosing in plan portions of the associated mechanisms for placing empty containers upon the turret at one station and removing filled containers at another station;

Figures 4a, 4b and 4c disclose details of construction of portions of the mechanism for removing charged containers from the turret, the same operating parts being shown, in the several views, in the positions which they successively occupy during the operation of flexing or squaring a container;

Figure 5 is a vertical section through the rotating turret;

Figures 6 and 7 each disclose a portion of the charging mechanism, the moving parts of such mechanism being illustrated in different positions in the two views;

Figure 8 is a section on line 8—8 of Figure 6;

Figure 9 shows in side elevation portion of the charging mechanism, this portion constituting the lower end of the discharge conduit through which liquid passes to a container;

Figure 10 is a section on line 10—10 of Figure 6;

Figure 11 is a section on line 11—11 of Figure 10;

Figure 12 is a perspective view of portion of one element of the charging mechanism;

Figure 13 is a perspective view of a part to be mounted upon the element illustrated in Figure 12;

Figure 14 is a longitudinal axial section, on an enlarged scale, through the means by which liquid flows to a container to be discharged, this means including an element which also serves as a portion of the liquid metering device;

Figure 15 is a similar section, showing certain of the operating parts of this means in positions different from the positions which they are shown to occupy in Figure 14, i. e., in the positions which they occupy when liquid is actually flowing into the open upper end of a container;

Figure 16 is an end view of a valve member which forms an element of the mechanism shown in Figures 14 and 15;

Figure 17 is a section on lines 17—17 of Figure 4;

Figure 18 is a section on line 18—18 of Figure 17;

Figure 19 is a section on line 19—19 of Figure 17;

Figure 20 is a similar section, showing the operating parts illustrated in different relative positions;

Figure 21 is a section on line 21—21 of Figure 1;

Figure 22 is a section on line 22—22 of Figure 1;

Figure 23 is a diagram from which may be observed the several stations in the cycle of movement of the turret at which movements of the principal or more essential elements of the container charging and associated mechanisms occur; and Figure 24 is a perspective view of a container of the type which the mechanism has been primarily designed to fill or charge.

The container of Figure 24 comprises the subject matter of Patent No. 2,047,891 issued July 14, 1936, to Henry T. Scott, and is fabricated of paper. It has an elongated tubular body which is square in cross-section and, as illustrated in Figure 24, has been partially completed, the bottom flaps having been folded and secured to form a staunch bottom closure, the container having been coated with paraffin or other liquid-proofing substance, and its upper end portion, comprising a group of marginally inter-connected panels, having been placed in condition to be finally relatively folded after the charging operation has been completed, preparatory to the final operations of sealing. The container is relatively stiff and self-supporting so that it will retain its shape as it goes through the container charging mechanism. It is quite possible, however, to charge by means of the improved mechanism of this invention containers which vary widely in shape and details of construction, provided that the container to be charged is self-supporting and has sufficient strength as a column to actuate the valve means of the charging mechanism when the container is raised so that its upper end engages such means.

The mechanism includes a charging apparatus which is generally indicated at A, and associated apparatus, generally indicated at B, for conveying a series of empty containers to the charging apparatus and depositing those containers successively onto such apparatus, and a further associated apparatus, generally indicated at D, which serves to remove from the charging apparatus A the charged or filled containers as they reach a discharge station, the container removal apparatus including conveying means for transporting the charged containers to mechanisms for closing and sealing the same. Each container, as it passes apparatus B, charging mechanism A, and apparatus D successively occupies a series of positions which are indicated in Figures 1, 4 and other figures of the drawings by the reference numerals C1, C2, C3, etc.

Containers at positions C1, C2 and C3 are supported upon the upper reach of a conveyor of the endless chain type which is moving in the direction of the arrow G to be seen in Figure 1. Each container, upon reaching C3, is engaged by a pusher arm of a rotating head and is caused to successively pass through positions such as indicated at C4, being ultimately delivered onto a container support which comprises a portion of the filling or charging mechanism A. A container at position C5 (Figure 1) is seen to be passing onto such a container support positioned to receive it. From position C5 it will pass, moving in the direction of the arrow H, along an arc of substantially 270°, around the vertical axis of the charging unit A until it reaches position C8. As it reaches that position it is contacted by a pusher element of a conveyor which comprises a portion of the container removal mechanism D and is pushed off of the container support upon which it has been resting and advanced along a trackway to a station at which it is to be further processed. It is during the passage of the container from container position C6 to container position C7 that it is charged with liquid, there being a liquid measuring and charging device associated with each container support having a liquid discharge orifice directly above the same.

The mechanism for actually charging the containers successively with liquid will first be described in detail. The moving parts of the charging mechanism are mounted on a frame which is indicated at 10 in the drawings and which may be of any desired construction, being either an individual stand or forming a portion only of the frame of a larger machine. Supported in the frame 10 is a vertically disposed stationary shaft 11 having fixed upon its upper end a stationary disc-like member 12. Member 12 has a thickened periphery 12a which has formed therein a downwardly opening slot 12b, this slot comprising a cam slot or cam track. Mounted upon shaft 11, so as to be freely rotatable about the axis of that shaft, is a turret member 13, the mounting means preferably comprising roller bearings such as indicated at 14 and 15, respectively. Turret 13 includes a generally cylindrical central portion 16, a downwardly and outwardly flaring integral lower portion 17, which terminates in a horizontal annular flange 18, and a member 19 supported upon the upper end of cylindrical part 16 thereof, member 19 comprising a generally horizontal annular portion 19a, which terminates in a cylindrical peripheral flange 19b. The inner margin of member 19 is received within an annular groove formed in the thickened upper end of the cylindrical part 16 of the turret, bolts or other securing devices 21 securing the member 19 rigidly in position.

The upper edge of the cylindrical portion 19b of member 19 is cut away to provide an annular seat for a ring 21, ring 21 in turn supporting the liquid tank 22. Tank 22 is circular in horizontal section and is concentric and revoluble with the turret structure. It is supplied with liquid, from time to time as needed, through a liquid inlet duct 25 disposed co-axially of the tank and turret, the inflow of liquid being controlled by a valve V carried by a float 26. The arrangement is such that the liquid in the tank will not fall below a level indicated by the line 27 and will not rise above a level indicated by line 28. The details of the float and valve form no portion of the present invention and need not be described in detail.

Disposed within the tank 22 are a series of liquid receiving vessels 30, these vessels being positioned equidistantly from the axis of rotation of the tank and being equi-distantly spaced apart, there being one such vessel for each container support with its liquid discharge duct leading downwardly from such measuring vessel and terminating directly over the associated container support so as to be in position to discharge liquid directly into the open mouth of a container mounted on that support, as previously set forth. Each vessel 30 comprises an enlarged central portion 30a, a hollow tubular portion 30b extending upwardly therefrom and terminating in a liquid discharge port having a baffle 31 to prevent discharged liquid from striking the top of the tank, each vessel 30 also having at its lower end a tubular extension 30d which passes downwardly through an aperture in the generally horizontal bottom wall 22a of the tank 22.

It will be observed from an inspection of Figure 14 that there is formed upon the outer surface of the tubular prolongation 30d of the vessel 30 a peripheral flange 30e, the undersurface of which is conical. A clamping ring 33 directly underlies the flange 30e, this ring being supported upon the upper surface of nut 32. When nut 32 is tightened the margin of the bottom plate 22a of the tank which immediately encircles the tubular extension 30d is tightly clamped. By the specified means, the associated vessel 30 is rigidly secured in position, the securing means being of such character that the possibility of leakage is eliminated while, at the same time, it is easily possible to readily disassemble the several parts for the purpose of sterilization. The downwardly extending tubular portion 30d of each fluid measuring device is apertured just above flange 30e as at 30f, and aperture 30f comprises the entry port through which liquid from the tank may flow into the measuring vessel when the port is uncovered.

The inflow of liquid from the tank into the vessel 30 is controlled by a sleeve 35 slidably housed within tubular extension 30d. When sleeve 35 occupies the position in which it is shown in Figures 7, 14 and 15, the inflow of liquid from tank 22 may not occur. When port 30f is uncovered by a lowering of sleeve 35 to the position in which it is shown in Figure 6, liquid may flow freely through the port 30f as indicated by the arrow in Figure 6, and will rise in the measuring vessel to the level of the liquid in the tank, that is, until the upper level of the liquid within the measuring vessel is somewhere along the tubular upward extension 30b of that vessel, between the minimum and maximum tank liquid levels indicated by the lines 27 and 28.

Slidably mounted upon the lower end of sleeve 35 is a tubular member 36, sleeve 35 being provided with a vertically extending slot 35a and member 36 with an inwardly projecting element 36a extending into the slot so that member 36 may not rotate upon sleeve 35 although being at all times free to move axially thereon to a limited extent. The lower end of member 36 is provided with an external annular flange 36b which is provided with diametrically opposed, oppositely projecting extensions 36c, which can be seen clearly in Figure 9. Member 36 is interiorally restricted toward its lower end so as to provide an upwardly facing conical surface 36d and a downwardly facing conical surface which terminates in a conical seat 36e. Conical seat 36e normally rests upon the upwardly facing conical surface of a valve 37, this valve being rigidly secured or integral with the lower end of a stem 38 extending through the sleeve 35. Secured to or integral with the upper end of stem 38 is a second valve, indicated at 39, having a downwardly facing conical surface adopted to closely engage an upwardly facing conical surface formed upon the upper end of sleeve 35 so as to tightly close the upper end of the sleeve against the inflow of liquid. Normally, valve 39 is positioned as shown in Figure 14 and the member 36 rests upon valve 37, as also shown in this figure.

With these parts in the positions just described, no liquid can escape from the measuring vessel to the container C shown just below. Should, however, the container C be elevated from the position in which it is shown in Figure 14 to the position in which it is shown in Figure 15, the upper edges, Ca of the container, one of which is shown in Figure 14, will engage the undersurfaces of the flanges 36c previously referred to, the tubular member 36 will be lifted, as, for instance, from the position in which it is shown in Figure 14 to the position in which it is shown in Figure 15, the seating surface 36e will disengage the valve 37, thus opening the lower end of member 36, the stem 38 and valve 39 will be lifted, thus uncovering the inlet port at the upper end of sleeve 35, and the liquid contained in the measuring cylinder 30 will be free to flow downwardly through sleeve 35 and will be discharged into the container C, the flow continuing until the measuring cylinder has been completely emptied. A drip-guard integral with member 36 is indicated at 36f, this guard serving to catch and divert any falling liquid and to discharge that liquid over a pouring lip 36h laterally of the container beneath, thus preventing accidental contamination.

As will be observed in Figures 14 and 15, valve stem 38 is provided with lateral projections adjacent its upper end which maintain the axis of the valve substantially coincident with the axis of sleeve 35 when the valve is raised off of its seat, as indicated in Figure 15, these lateral projections being indicated at 38a and extending radially outwardly from the valve stem. Toward its lower end stem 38 is provided with a radially extending web or projection 38b, upon one side thereof, and a smaller projection 38c extending radially from the opposite side. The radial web 38b is provided toward its lower end with an inclined edge 38d which is only slightly spaced above the conical surface 36d of member 36 when member 36 is resting upon valve 37. The upper corner 39f of web 38b is inclined or rounded as shown and is normally spaced only a slight distance from the conical or inclined surface 35c formed upon the lower end of sleeve 35. When member 36 is elevated from the position in which it is shown in Figure 14 to the position shown in Figure 15, the conical surface 36d strikes the inclined face 38d of web 38b, and further upward movement of member 36 causes surface 36d to ride over inclined surface 38d as a cam surface, laterally deflecting the web 38b and the stem 38, this movement continuing until the valve 37 is eccentrically positioned with respect to its seat, as shown in Figure 15. As a result, the aperture intermediate the mutually facing conical surfaces of valve 37 and member 36 is crescent shaped in horizontal section, and a liquid stream which is crescent shaped in cross section and of varying thickness will be discharged downwardly and outwardly against the walls of the container below. It is highly advantageous to discharge the liquid in this manner in any case where the liquid being discharged has a tendency to foam, as does milk, the foaming being to a large extent prevented when a discharge device of the character described is utilized.

In order that the stem 38 and associated valves may be readily removed, the lower valve 37 is detachably secured to the lower end of stem 38, as indicated in Figures 15 and 16 of the drawings.

Valve 37 functions as a drip valve, tightly closing the lower end of the discharge conduit leading from the measuring vessel as soon as a container C is lowered after having been charged. During the time, therefore, that no container is in contact with member 36 there may be no leakage, this being a consideration of importance in the case of a machine for the packaging of liquid food products.

The sleeve 35 not only constitutes a tubular duct through which liquid may pass to a container to be charged, and a valve controlling the inflow of liquid into vessel 30 through port 30f but likewise constitutes a portion of the metering mechanism whereby a liquid charge, destined to be introduced into a container, may be measured with exactitude. Thus, when valve 39 is in closed position, as indicated in Figure 14, sleeve 35 and this valve taken together constitute a plunger which, if moved upwardly past the port 30f, will reduce the cubic content of the liquid chamber which includes the relatively large vessel 30a together with that portion of the interior of tubular extension 30b which lies above the upper end of the sleeve 35 and the valve 39 and the interior of the tubular extension 30d. The upward movement of the unit which comprises sleeve 35 and valve 39 is so regulated in the operation of the device that, when it terminates, the cubic content of the enclosed liquid receiving space above it will be exactly that desired. The upward movement is so regulated that, in any event, some liquid is discharged from the upper end of the tubular extension 30b so that it may be assured that the liquid has risen to the mouth of the discharge port of this extension and that the liquid receiving space of the device has been completely filled. The vertical travel of sleeve 35 may be precisely regulated and the means for effecting the vertical movements of this sleeve and its associated parts so that it will first function as a valve and thereafter as a metering plunger will now be described.

From an inspection of Figure 6 it will be perceived that, approximately midway between the ends of the sleeve, are two laterally extending parallel flanges indicated at 35f. Positioned intermediate flanges 35f is one end of a bell crank lever which is generally designated at L. The arm 42 of lever L extends in a generally horizontal direction and the free outer end thereof, which terminates intermediate flanges 35f of the sleeve is provided with enlarged corner portions 42a with rounded upper and lower surfaces adapted to engage respectively the mutually facing surfaces of flanges 35f. To the widened free end of lever 42 is attached a member 43 comprising a bridging bar 43a and wing portions 43b disposed in parallel planes. The enlarged terminal ends of these members 43b closely engage the parallel end surfaces of the flanges 35f as shown in Figure 10, and the member 43 thus serves to prevent rotation of the sleeve 35 about its axis.

The other arm of the bell lever crank L is a built-up construction and is telescopic so as to be variable in length. It includes as an outer member a sleeve 44 having a spherical enlargement 44a and an inner member in the nature of a spindle 55 which extends upwardly into the cam track 12b previously described. Rotatably mounted upon the upper end of spindle 55 is a roller 56 with a spherical surface, this roller being a cam follower. The spindle 55 is provided with a longitudinally extending elongated slot 55a passing entirely therethrough, this slot having an enlargement 55b at its lower end, as shown in Figure 6. Spindle 55 is likewise provided with an axial bore at its lower end which is interiorally threaded, and this bore receives the exteriorally threaded member 57 which is secured to and rotatable with a cup-shaped cap 58. Cap 58 may be exteriorally knurled or roughened, and is provided with an annular outwardly projecting flange 58a which may be clamped between the annular lower end surface of member 44 and the inner annular flange 58b of a cup-shaped lock-nut 60. Lock-nut 60, when tightened, clamps flange 58a of cap 58, holds threaded member 57 against rotation, and thus maintains spindle 55 in fixed relationship to member 44. The spindle, however, may be vertically adjusted by releasing the lock-nut 60 and rotating cap 58 and threaded member 57 so that the distance between the cam follower 56 and the axis upon which the lever is mounted may be varied at will, thus varying the angle of oscillation of the lever under the influence of the cam and the vertical travel of the sleeve 35. Action of the sleeve 35 and valve 39 as a metering plunger may thus be modified.

Extending through slot 55a is a member 62 which comprises a pivot upon which the lever L is mounted for rocking movement. The mid-portion of member 62 is of reduced diameter, as clearly shown in Figure 8, while the end portions are larger and comprise trunnions which engage in cylindrical apertures formed in the annular supporting member 63 secured to the undersurface of the horizontally extending portion 19a of the turret part 19 previously referred to. As thus formed and supported, the entire lever L may be easily removed for the purpose of repair or sterilization, the spindle 55 being first elevated until the enlarged cylindrical recess at the bottom of the slot is coaxial with member 62, whereupon the member may be moved longitudinally until the lever is disengaged and the lever lowered and removed.

The outer surface of the intermediate portion 44a of the outer part 44 of the vertical leg of the lever L is, as previously stated, spherical. Encircling this portion and engaging the upper surface thereof is a ring 64 having a spherical downwardly facing surface normally maintained in close engagement with the surface of the spherical enlargement 44a by means of a helical spring 65. Ring 64 constitutes a movable spring abutment and the arrangement is such that the sleeve 44 is at all times pressed downwardly upon its supporting pin 62, play being thus prevented even though wear may cause looseness. The cam track 12b is so formed that, as the turret 13 revolves about its vertical axis, the several levers L will be rocked or oscillated about their horizontal axes to produce the desired rising and falling movements of the corresponding sleeves 35 associated with the measuring vessels. The filling, metering and discharging operations of each liquid measuring means thus occur in desired sequence. From an inspection of Figure 23 the sequence and extent of the various operations of the moving parts of the mechanism may be observed.

The container supports are arranged in a circular series as previously explained, there being one container support for each liquid measuring device and each being directly below such device. These supports, indicated at S, may be seen in Figures 5, 17 and 18. Each such support includes a stationary block 70 which is preferably generally cylindrical, with its axis vertically disposed. The horizontal flange portion 18 of the rotatable turret 13 is provided with a circular series of equidistantly spaced apertures through which the several blocks 70 project and, extending downwardly from the under surface of the flange 18, are a series of cylindrical flanges 18a, the inner wall surface of each such flange being closely engaged by the outer surface of the lower portion of the associated block 70 so that the blocks are securely held against horizontal displacement or rocking movement with respect to flange 18. Each block 70 is provided with a peripheral flange 70a which is received within an annular groove formed in the upper surface of the turret flange 18 and encircling the block receiving aperture. A bolt 71 disposed within a vertically extending bolt receiving recess in the block, the lower end of the bolt having threaded engagement with an aperture formed in the disc-like member 72, the periphery of which underlies the annular downwardly facing end surface of flange 18a. When the bolt 71 is tightened block 70 will be secured against vertical displacement. There may be several such securing bolts if desired.

Directly above each block 70 is a disc-like element 73, horizontally disposed and a portion of the upper surface of which comprises a seating surface for a container to be filled, a container the base of which is resting upon such a seating surface being illustrated in chain lines in Figure 17. To the member 73 is affixed cylindrical skirt 74 which encircles the block 70, the arrangement being such that, when the container supporting platform 13 is elevated from the position in which it is shown in Figures 17 and 18 to the position in which it is shown in Figure 5 (to the right of that figure), no gap between member 73 and block 70 may be observed. Means for raising and lowering the container supporting disc 73 includes a vertically extending rod 75, the enlarged upper end of which is secured by screw bolts to the under-surface of member 73 and which is slidably mounted in bearings 70b disposed within a cylindrical vertically extending aperture 70c which passes entirely through the block 70. Upon the lower end of rod 75 is mounted a pin which carries a roller or cam follower 76, this follower being positioned within a cam track 77 cut in the outer surface of the annular cam member 78 which is mounted upon the horizontally extending web by 10a of the supporting frame 10.

As the turret revolves, the several rods 75 will be successively elevated as the successive cam followers 76 reach an upwardly inclined portion of the cam track 77, each container platform 73 being lifted, for instance, from the position in which it is illustrated, at the left of Figure 5, to the position in which it is shown at the right of the same figure. At a later point in the travel of each cam follower it will reach a descending portion of the cam track and the associated rod 75 and container supporting member 73 will descend. By this means a container placed upon a container receiving member 73 at one station will be given a rising and falling movement as the turret rotates. The direction of turret rotation is indicated by the arrow R in Figure 23 and it will be observed from an inspection of this figure that it includes legends which indicate the positions in its orbit of travel at which each container support starts to rise and starts to descend, as well as indicating by other legends the initial and final movements of other operating parts of the mechanism. As heretofore explained, each container, as it is moved upwardly, engages the vertically movable member 36 of the dispensing mechanism immediately above it and lifts that member, thus opening the valve and releasing the liquid to be dispensed. Legends on the diagram, Figure 23, indicates the positions of the container support when the filling operation commences, likewise the points in the rotary travel of each filling mechanism at which the sleeve 35 closes and opens the port 30f. When the container descends the member 36 is likewise lowered and valves 37 and 39 close. The movement of the entire assembly, comprising sleeve 35, member 36 and the valve means is, as explained, brought about by the associated arm L.

Means associated with each container support grips and steadies the container while it is being filled. This means is likewise shown in Figures 5, 17, 18, 19 and 20. Stationary parallel container engaging arms are indicated at 80, each of these arms extending horizontally from a stationary spindle-like vertically extending member 81, the lower end of which rests upon the upper end of a short cylindrical pedestal 73a integral with the container supporting element 73. Member 81 is securely held in the position in which it is illustreated by means of a screw bolt 82. It will be observed that the arms 80 are positioned to engage one vertical sidewall of a container placed upon the adjacent container support. The container engaging arms of a second pair of such arms are indicated at 84, one end of each of these arms being integral with or affixed to a vertical spindle-like member 85 which is similar to the member 81. Member 85 is mounted to rotate about its vertical axis and means is provided for effecting its rotation to swing the associated arms 84 into and out of container engaging position at desired points in the travel of the turret.

As disclosed in Figures 1 and 4, a container at position C5 is not engaged by either pair of container embracing arms and arms 84 of the associated gripping mechanism are swung away from arms 80 to permit the ready placement of the container on the container support. A container which has been moved into position C6 is shown to be gripped by both container embracing arms, arms 84 having been swung towards arms 80 and the container moved against arms 80 and closely engaged by both pairs of arms. From position C6 to position C7 each successive container is thus securely maintained in position beneath a liquid dispensing means. As each container moves from position C7 to position C8 the container embracing arms 84 are swung away and the container is thus released so that it may be removed from the charging turret.

The means for rotating a member 85 at the proper times, and thus swinging the associated arms 84 toward and away from a container includes a vertically disposed spindle 88, the upper end of which is provided with an axially extending threaded recess which receives the threaded lower end of a screw bolt 89, the spindle 88 being thus suspended in the position in which it is shown in Figure 18, an annular flange 88a integral with the spindle closely engaging the undersurface of member 73. The lower end of spindle 88 is disposed within a sleeve 90 and is keyed thereto. A short cylindrical part 91 secured within sleeve 90 by means of a rivet 92 comprises an integral extension of a member 93 in the nature of a crank, this crank having rotatably mounted upon its outer end a cam follower 94 which is located in a cam track 95 formed in the upper surface of the annular cam member 78 previously referred to. As the turret rotates the cam follower will be moved inwardly and outwardly by reason of variations in the position of the cam track, for instance, from the position in which it is shown in Figure 19 to the position in which it is shown in Figure 20, and, as a result of this radial movement of the cam follower 94, the member 85 will be oscillated about its vertical axis and the arms 84 will be swung from the positions in which they are shown in Figure 19 to the positions in which they are shown in Figure 20, and thereafter back to the first position, in order to perform their essential container engaging and holding functions.

Novel means is employed for successively placing empty containers upon the container supporting members which are successively moved into container receiving position, this means being illustrated in Figures 1, 2 and 3, inclusive. It includes a conveyor which is generally indicated at W and the precise details of construction of which may be widely varied and hence need not be precisely described. It is the function of the conveyor to move containers placed thereon in the direction of the arrow G from a conveyor charging position, which may be some distance away, to the ultimate container position C3, at which position the container is engaged by further means later to be described. Preferably, the conveyor W is of the endless chain type, the chain having mounted thereon a series of flat container supporting plates of relatively small size, such as indicated at 100. A container upon moving into position C3 has its forward motion halted by reason of the engagement of its leading face or side with two flat surfaces of the vertically spaced horizontally disposed members 101 and 102, members 101 and 102 comprising annular rings disposed in coaxial relationship and each having a series of radiating arms, these arms being indicated at 101a and 102a respectively, and each arm 101a directly overlying a similar arm 102a. The vertically disposed outwardly facing areas of rings 101 and 102 which comprise stop surfaces, arranged in pairs, for the on-coming containers respectively are indicated at 101b and 102b in Figure 2, and are tangentially disposed with respect to the axis about which the members 101 and 102 rotate. The members 101 and 102 are mounted upon a domelike support 104, these members encircling member 104 and being rigidly secured thereto. The arms 101a and 102a are not disposed radially of the axis of rotation of support 104 as may be seen from an inspection of Figure 1, but each is so positioned that it will, when it reaches container engaging position, lie closely parallel to a flat surface of a container reaching position C3. Successive pairs of arms are so relatively disposed angularly that a container may be readily introduced into the space between them. The drum 104 is carried upon a vertically extending shaft 105 which, in the normal operation of the machine, rotates at a pre-determined constant angular velocity so that successive containers are moved from position C3 through position C4 into position C5. The conveyor W may be continuously operated or intermittently operated, but is preferably continuously operated and at such linear velocity as to bring successive containers into position C3 in timed relationship to the rotary movements of the drum 104 and the container engaging and pushing arms. Each container, as it leaves the conveyor, will move on to the curved horizontal trackway or container supporting rail 106 by means of which the container is slideably supported until it is pushed on to a platform member 73, at position C5.

To insure that containers approaching the container engaging arms 101a and 102a are properly spaced upon the conveyor W, and hence will move in perfect timed relationship to the means just described for circularly moving the containers onto the charging machine, a container positioning device is employed. This device includes a spacing finger 108 mounted upon a horizontally extending shaft 109 suitably supported for rocking movement in the frame of the machine. The finger 108 is L-shaped as shown in Figure 2 of the drawings and is adapted to be moved from the position in which it is shown in full lines in this view to the position in which it is shown in dotted lines in the same figure. When moved to its full line position the free end of the finger 108 projects into the path of movement of containers upon conveyor W and will halt the movement of any container, such as the container C, which strikes against it. When it is removed from full line position to dotted line position such container is released and may continue its movement with the conveyor in the direction of the arrow G. It will be understood that the containers passing the finger 108 are moving between parallel side guides 110 and 111 and may not rotate when engaged and temporarily halted by finger 108. The finger is operated at intervals which are precisely timed with relation to the movement of shaft 105, the shaft 109 upon which the finger 108 is mounted having affixed to one end a radially extending arm 112 which carries a cam roller or follower 113, which is in constant engagement with the under surface of the cam 114 secured to the horizontal under-surface of the bottom plate of member 104. As shaft 105 revolves, carrying with it the arms 101a and 102a, the successive containers will be properly positioned on the conveyor for engagement by the arms and, despite any irregularities of movement of the conveyor W, the oncoming containers will be successively fed into position C3 at the desired intervals.

As heretofore explained, each container, after having been charged with liquid, ultimately reaches the position C8 shown in Figure 1, and is there engaged by means which removes the container from the charging machine without spilling any of its contents. This mechanism comprises essentially an endless conveyor which includes upper and lower conveyor chains 120 and two superposed series of container receiving brackets 121, mounted upon the chains 120, respectively, each bracket having a long container engaging arm 121a and a shorter container engaging arm 121b, these arms extending outwardly from the chain 120 and being substantially parallel, likewise two container engaging abutments 121c intermediate arms 121a and 121b. Each container reaching position C8 is released by the gripping arms which have been in engagement with its opposite sidewalls up until that point and arms 121a of the conveyor move into position and engage one flat face of that container as shown in Figure 4, the container engaging bracket being at that time at the approximate midpoint of an arc of travel along which it moves as each conveyor chain 120 passes around a chain supporting sprocket keyed to member 128, as illustrated in Figure 21. Continued movement of the chains and brackets 121 cause the container engaged thereby to move from the container supporting surface of member 73 upon which it has been resting, on to the circular container supporting trackways 122, parallel vertically disposed arcuate guides 123 constraining the container to a path of movement directly above supports 122 and also causing the container to move into position to be engaged by the shorter bracket arms 121b and into contact with the lugs 121c previously mentioned, a container thus positioned being indicated at position C12. From position C12 the container will be moved, in the direction indicated by the arrow V, to further mechanisms for closing and sealing the same.

During the time that the container is moved from position C8 to C12 its upper end is squared by a means now to be described. It will be understood that containers of the type of that illustrated in Figure 24 are initially formed as collapsed or flat tubular members. After having been squared out each tends to resume its original shape and to revert from a truly square member to a diamond shaped member, this following from the natural tendency of distorted fibers to resume the positions which they originally occupied. By reason of the fact that the bottom of the container has been closed its lower end is staunchly braced and may not become distorted. The upper end, however, which is as yet unclosed, will have a rather strong tendency to become diamond shaped in horizontal section. Means is therefore provided for distorting the container top in such manner as to counteract this tendency, this means including a pusher element adapted to make contact with one corner of the container top and to move this corner toward the stationary rail 123. These container distorting fingers, which are four in number, are indicated at 125. Each is mounted for oscillation about a fixed vertical axis, its inner end being supported on a pin 126 carried in a rotatable member 127. Member 127 is secured to the upper end of a cylindrical block 128 which encircles a sleeve 129 within which is disposed a stationary shaft 130. Upon the top of shaft 130 is mounted a fixed cam 131 having a downwardly facing cam track 131a. Within cam track 131a are four cam rollers 132, each of which is fixed upon the end of an arm 133. Each arm 133 is mounted upon a pin 126 and is therefore fixed with relation to the associated finger 125. As member 127 rotates each finger 125 rocks about the axis of the associated pin 126, occupying the several successive positions indicated clearly in Figures 4, 4a, 4b and 4c. As finger 125 moves from the position in which it is shown in Figure 4a to the position in which it is shown in Figure 4b, the upper end of a container occupying position C10 is distorted, the corner engaged by finger 125 being pressed toward the diametrically opposed corner. As the container moves further, and into position C12, the pressure finger 125 recedes and the top of the container will resume approximately a square horizontal section so that it may be received and satisfactorily manipulated by the container top folding mechanism which is provided to effect the final closing of the charged container. The rails 123 function to limit the outward movement of the container during this distortion, and thus cooperate with the members 121 and 121a.

As shown in Figure 22, the straight reaches of chains 120 upon which brackets 121 are mounted are supported upon rails 140. Each rail includes a laterally facing recess which serves as a runway for chain supporting rollers 141 mounted upon stub axles carried by the chain, and also is so formed as to provide a downwardly facing slot 142 which constitutes a protective runway for the chain proper, the chain having rollers 143 spaced along its length to reduce friction.

Having described the invention, what is claimed as new and desired to be secured by Letters Patent, is:

1. Liquid dispensing means comprising a chamber having an upper outlet port and a tubular passage leading downwardly therefrom, said passage having a liquid inlet port formed in the wall thereof, means within said passage for controlling the flow of liquid therethrough and also for controlling the inflow of liquid through said inlet port, said means including a sleeve and a valve normally closing the sleeve, and mechanism for separately operating the sleeve and valve.

2. Liquid dispensing means comprising a chamber having an upper outlet port and a tubular passage leading downwardly therefrom, said passage having a liquid inlet port formed in the wall thereof, means within said passage for controlling the flow of liquid therethrough and also for controlling the inflow of liquid through said inlet port, said means including a sleeve and a valve normally closing the sleeve, means for reciprocating the sleeve within said tubular passage and separate means for operating said valve.

3. Liquid dispensing means comprising a chamber having an upper outlet port and a tubular passage leading downwardly therefrom, said passage having a liquid inlet port formed in the wall thereof, means within said passage for controlling the flow of liquid therethrough and also for controlling the inflow of liquid through said inlet port, said means including a sleeve and a valve normally closing the sleeve, means for reciprocating the sleeve, said means being adjustable so that the extent of the upward movement of the sleeve may be precisely regulated, and separate means for operating said valve.

4. Liquid dispensing means including a vertically disposed tubular liquid conduit, a second tubular conduit slideably mounted on the lower end of said first conduit, the lower end of said second conduit having a valve seat formed thereon, a valve stem carried by the first tube, a valve secured to the lower end of said valve stem, the valve seat of said second conduit normally engaging said valve and the weight of said second conduit being normally transmitted to said valve and valve stem, and means associated with the valve stem and second tubular member to effect automatically lateral displacement of said valve when said second member is elevated.

5. A device for discharging liquid into a container comprising telescoping tubular members, valve stem and valve, the valve comprising a stop limiting the downward movement of the lowermost of said members and normally closing the same, the valve stem extending upwardly through the passage defined by said members and supporting the valve, said valve stem and lowermost tubular member having portions adapted to mutually and automatically engage when said member is lifted to thrust the valve and stem laterally.

6. The combination set forth in claim 5 in which a second valve is secured to said stem and normally closes the uppermost tubular member.

7. A liquid discharge device comprising a vertically disposed tube having upper and lower telescoping tubular members, a valve normally closing the upper end of the upper member, a second valve normally closing the lower end of the lower member, and a valve stem connecting said valves, said stem and lower member having parts adapted to mutually engage when said lower member is lifted so as to cause the lower end of the valve stem, and the lower valve, to move transversely of the tube, and the upper valve to be unseated.

8. Liquid measuring mechanism comprising a chamber having an upper outlet, a tube extending downwardly therefrom through which liquid may escape, said tube having an inlet port formed in the wall thereof through which liquid may enter to fill the chamber, a sleeve slidably fitting within the tube to open and close the inlet port, a valve mounted upon said sleeve for controlling the flow of liquid through said sleeve, and means for sliding said sleeve axially of said tube, said means including a bell crank lever having a two part extensible arm and a support for said arm having a pivot pin, both parts of said extensible arm being transversely apertured for the reception of said pivot pin, the aperture in one part being an elongated slot to permit movement of said part relatively to the pin.

9. The combination set forth in claim 8 in which resilient means is positioned to constantly act upon one of said parts of the extensible arm to cause said part to maintain full bearing at all times against one side of said pin.

10. Liquid measuring mechanism comprising a chamber having upper and lower outlets and an inlet port intermediate said outlets, the lower outlet comprising an unobstructed tubular member, and means within said tubular member for controlling the outflow of liquid therefrom, said means including a sleeve the outer surface of which engages the wall of said tubular outlet with a close sliding fit, a flow controlled valve carried by the sleeve and normally closing the same, at the upper end thereof, and means for moving said sleeve upwardly through said tubular member a predetermined but variable distance.

11. Liquid measuring mechanism comprising a chamber having an upper outlet, a tube extending downwardly therefrom through which liquid may escape, said tube having an inlet port formed in the wall thereof through which liquid may enter to fill the chamber, means within the tube and movable axially thereof for opening and closing the same and opening and closing said inlet port, and separate actuating devices for causing said means to open and close said tube and port respectively.

12. Liquid measuring mechanism comprising a chamber having an upper outlet, a tube extending downwardly therefrom through which liquid may escape, said tube having an inlet port formed in the wall thereof through which liquid may enter to fill the chamber, a sleeve slidably fitting within the tube and movable to close and open said inlet port, a valve bodily movable with, and movable relatively to, said sleeve, for controlling the flow of liquid through said sleeve, means for positively reciprocating said sleeve and separate means for actuating said valve.

13. Liquid measuring mechanism comprising a chamber having an upper outlet, a tube extending downwardly therefrom through which liquid may escape, said tube having an inlet port formed in the wall thereof through which liquid may enter to fill the chamber, a sleeve slidably fitting within the tube and having a seating surface for a valve formed on one end, a valve normally seated on said surface, the sleeve being adapted to close and open said inlet port and the sleeve and valve together constituting a plunger effective to reduce the capacity of the chamber when advanced past the said inlet port, and separate means for actuating said sleeve and valve respectively, the sleeve being movable through variable distances on its working stroke.

14. Liquid measuring mechanism comprising a chamber having upper and lower outlet ports and an inlet port intermediate said outlet ports, and means for controlling the inflow of liquid through said inlet port and the outflow of liquid from said chamber through said lower outlet port, said means including two relatively movable members one of which is carried by the other, means for positively actuating one of said members to effect simultaneous movement of both, and second means for effecting relative movement of said members.

15. A liquid discharge device comprising coaxial telescoping tubular members, two valves, one for closing the outer end of one member, and the second for closing the outer end of the second member, and a valve stem rigidly connecting the valves, the axis of said stem being normally coincident with the axis of said members, said stem and one of said members having parts adapted to mutually engage when said member is moved to open one valve and to effect swinging movement of the stem about a transverse axis and movement of said second valve transversely of the axis of said members.

ROBERT SPURR.

REFERENCES CITED

The following references are of record in the file of this patent:

UNITED STATES PATENTS

| Number | Name | Date |
|---|---|---|
| 889,106 | Cunningham | May 26, 1908 |
| 1,147,346 | Thompson | July 20, 1915 |
| 1,342,173 | Joslin | June 1, 1920 |
| 1,523,607 | Prael | Jan. 20, 1925 |
| 1,531,794 | Larsen | Mar. 31, 1925 |
| 1,554,805 | Fullips | Sept. 22, 1925 |
| 1,965,045 | McLaughlin et al. | July 3, 1934 |
| 2,138,355 | Ryan et al. | Nov. 29, 1938 |
| 2,138,937 | Petroe | Dec. 6, 1938 |
| 2,168,380 | Winton | Aug. 8, 1939 |
| 2,200,189 | Olin | May 7, 1940 |
| 2,226,619 | Larsen | Dec. 31, 1940 |
| 2,234,305 | Huntley et al. | Mar. 11, 1941 |
| 2,330,596 | Kotcher et al. | Sept. 28, 1943 |
| 2,348,582 | Weaver | May 9, 1944 |
| 2,353,519 | Spurr | July 11, 1944 |

FOREIGN PATENTS

| Number | Country | Date |
|---|---|---|
| 325,240 | Great Britain | Feb. 14, 1930 |
| 553,677 | France | July 5, 1922 |
| 833,076 | France | Feb. 2, 1938 |